(12) United States Patent
Sawant et al.

(10) Patent No.: US 11,144,839 B2
(45) Date of Patent: Oct. 12, 2021

(54) PROCESSING DATA FOR USE IN A COGNITIVE INSIGHTS PLATFORM

(71) Applicant: Accenture Global Solutions Limited, Dublin (IE)

(72) Inventors: Nitin Madhukar Sawant, Mumbai (IN); Rajendra T. Prasad, Bangalore (IN); Bhavin Mehta, Mumbai (IN); Jayant Swamy, Bangalore (IN); Gopali Raval Contractor, Mumbai (IN); Manish Vijaywargiya, Hyderabad (IN)

(73) Assignee: Accenture Global Solutions Limited, Dublin (IE)

( * ) Notice: Subject to any disclaimer, the term of this patent is extended or adjusted under 35 U.S.C. 154(b) by 688 days.

(21) Appl. No.: 15/411,469

(22) Filed: Jan. 20, 2017

(65) Prior Publication Data

US 2017/0213139 A1     Jul. 27, 2017

(30) Foreign Application Priority Data

Jan. 21, 2016   (IN) .............................. 201641002260

(51) Int. Cl.
| | |
|---|---|
| *G06N 5/04* | (2006.01) |
| *G06N 20/00* | (2019.01) |
| *G06N 3/00* | (2006.01) |

(52) U.S. Cl.
CPC ............. *G06N 5/043* (2013.01); *G06N 3/006* (2013.01); *G06N 5/045* (2013.01); *G06N 20/00* (2019.01)

(58) Field of Classification Search
CPC ........ G06N 3/006; G06N 5/043; G06N 5/045; G06N 20/00; G06N 99/005
See application file for complete search history.

(56) References Cited

U.S. PATENT DOCUMENTS

| | | |
|---|---|---|
| 7,690,037 B1 | 3/2010 | Hartmann |
| 2003/0061246 A1* | 3/2003 | Bowman ................ G06Q 10/10 |

(Continued)

FOREIGN PATENT DOCUMENTS

WO        01/93076        12/2001

OTHER PUBLICATIONS

Australian Second Examination Report corresponding to AU 2017200378, dated Dec. 21, 2017, 8 pages.

(Continued)

*Primary Examiner* — Li B. Zhen
*Assistant Examiner* — Selene A. Haedi
(74) *Attorney, Agent, or Firm* — Harrity & Harrity, LLP

(57) ABSTRACT

A device may receive issue resolution information, associated with a cognitive model, including an item of issue resolution information that describes an issue and a resolution to the issue. The device may assign the item of issue resolution information to a domain hierarchy, where the assigning is associated with a first user. The device may generate a question and an answer corresponding to the item of issue resolution information, where the generating of the question and the answer is associated with a second user. The device may approve the question and the answer, where the approving is associated with a third user. The device may generate a question/answer (QA) pair for the question and the answer. The device may create a data corpus including the QA pair, and provide the data corpus to cause the cognitive model to be trained based on the data corpus.

20 Claims, 9 Drawing Sheets

(56) References Cited

U.S. PATENT DOCUMENTS

| | | | |
|---|---|---|---|
| 2004/0254917 A1 | 12/2004 | Brill et al. | |
| 2006/0143254 A1 | 6/2006 | Chen et al. | |
| 2007/0083589 A1* | 4/2007 | Olsen | G06Q 10/10 |
| | | | 709/203 |
| 2010/0138712 A1 | 6/2010 | Lee et al. | |
| 2011/0125734 A1 | 5/2011 | Duboue et al. | |
| 2012/0101807 A1* | 4/2012 | Heo | G06F 16/3331 |
| | | | 704/9 |
| 2013/0066886 A1 | 3/2013 | Bagchi et al. | |
| 2014/0120513 A1 | 5/2014 | Jenkins et al. | |
| 2014/0270108 A1 | 9/2014 | Riahi et al. | |
| 2014/0297571 A1 | 10/2014 | Beamon et al. | |
| 2015/0186784 A1* | 7/2015 | Barborak | G09B 7/04 |
| | | | 706/11 |
| 2015/0269139 A1* | 9/2015 | McAteer | G06F 17/2785 |
| | | | 704/9 |
| 2015/0339574 A1* | 11/2015 | Allen | G06F 16/2365 |
| | | | 706/11 |
| 2016/0179939 A1* | 6/2016 | Levas | G06F 16/3344 |
| | | | 707/728 |
| 2016/0378736 A1* | 12/2016 | Byron | G06F 3/0484 |
| | | | 715/234 |
| 2017/0017716 A1* | 1/2017 | Joshi | G06F 16/93 |
| 2017/0206270 A1* | 7/2017 | Bufe, III | G06F 16/334 |

OTHER PUBLICATIONS

Wikipedia, "Role-based access control", https://en.wikipedia.org/wiki/Role-based_access_control, Feb. 13, 2018, 6 pages.

Duclaye et al., "Learning Paraphrases to Improve a Question-Answering System", Proceedings of the 10th Conference of EACL Workshop Natural Language Processing for Question-Answering, 7 pages, 2003.

Malakasiotis, "Paraphrase Recognition Using Machine Learning to Combine Similarity Measures", Proceedings of the ACL-IJCNLP 2009 Student Research Workshop, pp. 27-35, Aug. 4, 2009.

Ganitkevitch, "Large-Scale Paraphrasing for Natural Language Understanding", Proceedings of the NAACL HLT 2013 Student Research Workshop, pp. 62-68, Jun. 13, 2013.

Zhao et al., "Learning Question Paraphrases for QA from Encarta Logs", Proceedings of the 20th International Joint Conference on Artificial Intelligence, 6 pages, Jan. 6-12, 2007.

Fader et al., "Paraphrase-Driven Learning for Open Question Answering", Proceedings of the 51st Annual Meeting of the Association for Computational Linguistics, pp. 1608-1618, Aug. 4-9, 2013.

Australian First Examination Report corresponding to AU 2017200378, dated Jun. 9, 2017, 9 pages.

* cited by examiner

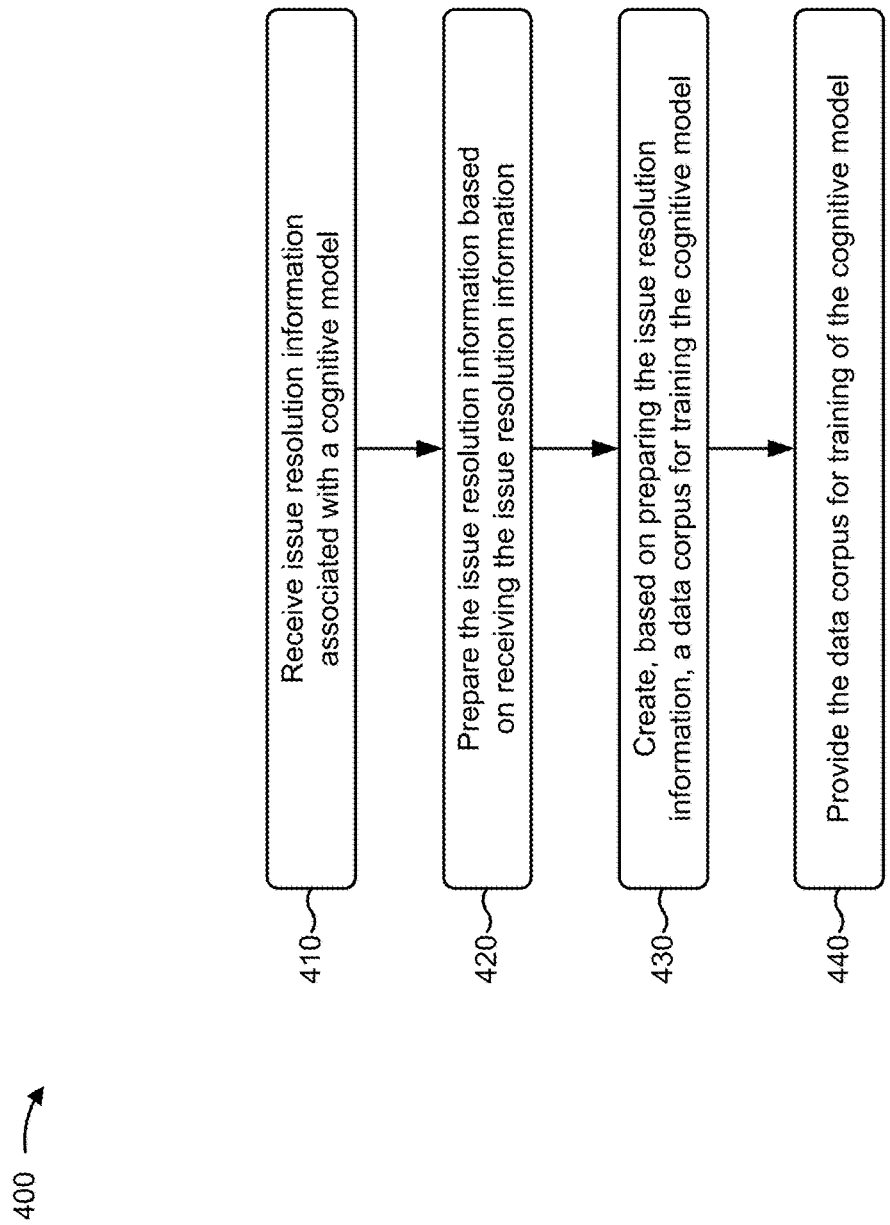

PROCESSING DATA FOR USE IN A COGNITIVE INSIGHTS PLATFORM

RELATED APPLICATION

This application claims priority under 35 U.S.C. § 119 to Indian Patent Application No. 201641002260, filed on Jan. 21, 2016, the content of which is incorporated by reference herein in its entirety.

BACKGROUND

A cognitive model may be a computer model that is designed to simulate human problem solving and/or mental task processes. A cognitive model may be used to simulate or predict human behavior or performance on tasks similar to those modeled.

SUMMARY

According to some possible implementations, a device may include one or more processors to: receive issue resolution information associated with a cognitive model, where the issue resolution information may include an item of issue resolution information that describes an issue and a resolution corresponding to the issue; assign the item of issue resolution information to a particular domain hierarchy, where the assigning of the item of issue resolution information to the particular domain hierarchy may be associated with a first user; generate a set of questions and an answer corresponding to the item of issue resolution information, where the generating of the set of questions and the answer may be associated with a second user that is different from the first user; approve the set of questions and the answer corresponding to the item of issue resolution information, where the approving of the set of questions and the answer may be associated with a third user that is different from the first user and the second user; generate, based on approving the set of questions and the answer, a set of question/answer (QA) pairs for the set of questions and the answer, where each QA pair, of the set of QA pairs, may be associated with a question, of the set of questions, and the answer; create a data corpus including the set of QA pairs; and provide the data corpus to cause the cognitive model to be trained based on a portion of the data corpus.

According to some possible implementations, a method may include: receiving, by a device, issue resolution information associated with a cognitive model, where the issue resolution information may include an item of issue resolution information that describes an issue and a resolution to the issue; assigning, by the device, the item of issue resolution information to a domain hierarchy of a plurality of domain hierarchies, where the assigning of the item of issue resolution information to the domain hierarchy may be associated with a first user; determining, by the device, one or more questions corresponding to the item of issue resolution information and an answer associated with the one or more questions, where the determining of the one or more questions and the answer may be associated with a second user that is different from the first user; approving, by the device, the one or more questions and the answer, where the approving of the one or more questions and the answer may be associated with a third user that is different from the first user and the second user; generating, by the device and based on approving the one or more questions and the answer, one or more question/answer (QA) pairs, where each QA pair, of the one or more QA pairs, may be associated with a question, of the one or more questions, and the answer; creating, by the device, a data corpus including the one or more QA pairs; and causing, by the device, the cognitive model to be trained based on a portion of the data corpus.

According to some possible implementations, a non-transitory computer-readable medium may store instructions that, when executed by one or more processors, cause the one or more processors to: receive issue resolution information associated with a cognitive model, where the issue resolution information may include an item of issue resolution information that describes an issue and a resolution corresponding to the issue; assign the item of issue resolution information to a particular domain hierarchy; generate, based on assigning the item of issue resolution information to the particular domain hierarchy, a question and an answer corresponding to the item of issue resolution information; approve, based on generating the question and the answer, the question and the answer corresponding to the item of issue resolution information; generate, based on approving the question and the answer, a question/answer (QA) pair corresponding to the question and the answer; create a data corpus including the QA pair; and provide the data corpus, after creating the data corpus, to cause the cognitive model to be trained based on a portion of the data corpus.

BRIEF DESCRIPTION OF THE DRAWINGS

FIG. 4 is a flow chart of an example process for processing data for use in training a cognitive model.

DETAILED DESCRIPTION

Figure 1A:
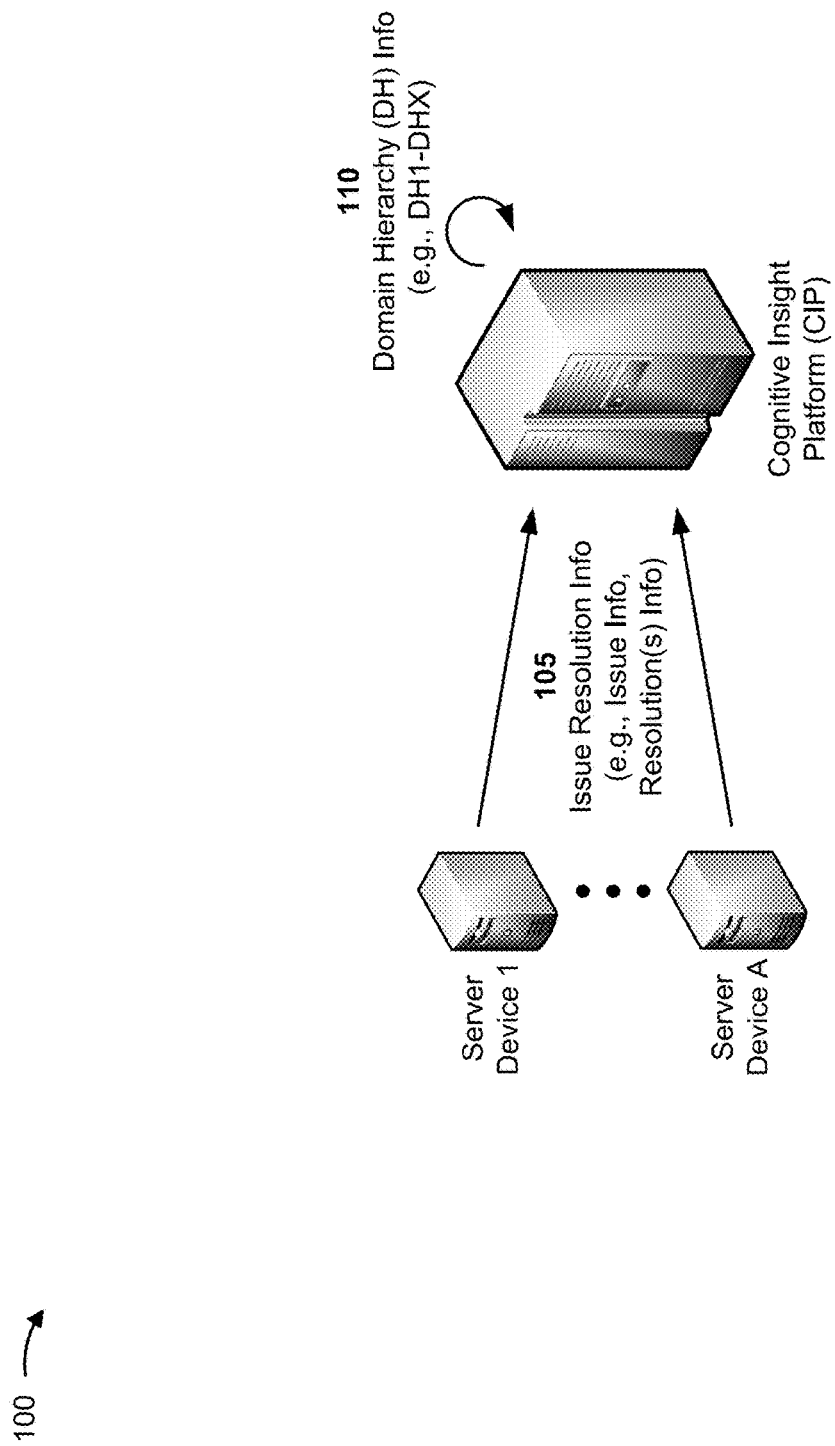
FIGS. 1A-1F are diagrams of an overview of an example implementation described herein.

The following detailed description of example implementations refers to the accompanying drawings. The same reference numbers in different drawings may identify the same or similar elements.

A cognitive model may include a computer model that is designed to mimic a human brain. For example, the cognitive model may be designed to receive data, analyze the data (e.g., to understand the data), provide an output (e.g., provide an answer to a question, perform an action, cause an action to be performed, recommend an action, etc.) based on inferences made as a result of analyzing the data, and learn based on feedback associated with the output (i.e., to improve future inferences and/or outputs based on the feedback). The cognitive model may include a natural language processing (NLP) model, a machine learning (ML) model, or the like, designed to receive data, analyze the data, and provide the output.

As a particular example, the cognitive model may be designed to receive (e.g., based on user input) a question, associated with an issue (e.g., a problem, an error, an incident, etc.), and provide (e.g., for display to the user) an answer to the question. Here, the cognitive model should be trained using a data corpus that comprises processed issue resolution information including descriptions of issues, resolution information associated with the issues, one or more questions associated with each of the issues (e.g., questions that may result in an answer that includes resolution information associated with an issue), one or more answers associated with each of the issues, or the like.

In such a case, the data corpus may be provided via a cognitive insight platform that supports the cognitive model. However, prior to the data corpus being used by the cognitive model for training, the cognitive insight platform may need to process the issue resolution information. Processing the issue resolution information may include, for example, receiving the issue resolution information, preparing the issue resolution information for use in creating the data corpus, creating the data corpus based on the prepared issue resolution information, and providing the data corpus for training of the cognitive model using the data corpus. Such processing of the issue resolution information may improve the training of the cognitive model by increasing a likelihood that an answer, provided by the cognitive model in response to a question, is responsive to the question, correctly answers the question, accurately answers the question, is useful in resolving an issue associated with the question, or the like.

Implementations described herein may provide a cognitive insight platform capable of processing issue resolution information that is to be used for training a cognitive model associated with the cognitive insight platform. In some implementations, the cognitive insight platform may implement a role-based workflow when processing the issue resolution information, as described in further detail below.

FIGS. 1A-1F is a diagram of an overview of an example implementation 100 described herein. As described below in connection with example implementation 100, in some implementations, a cognitive insight platform may process issue resolution information for training a cognitive model by: (1) receiving the issue resolution information, (2) preparing the issue resolution information, (3) creating a data corpus based on the prepared issue resolution information, and (4) providing the data corpus for training the cognitive model. Details of each of these steps are described below in association with FIGS. 1A-1F.

As shown in FIG. 1A, and by reference number 105, the cognitive insight platform may receive issue resolution information. For example, as shown, the cognitive insight platform may receive the issue resolution from one or more server devices (e.g., server device 1 through server device A) that store or have access to the issue resolution information. As another example, the cognitive insight platform may receive the issue resolution information based on user input provided via a user device (not shown).

The issue resolution information may include descriptions of issues and/or resolution information, associated with the issues (i.e., a manner in which the issues may be resolved), based on which the cognitive model is to be trained to provide an output. For example, the issue resolution information may include a word, a group of words, a sentence, or the like, that describes an issue. As another example, the issue resolution information may also include a word, a group of words, a sentence, or the like, that describes a manner in which the issue may be resolved. In some implementations, the issue resolution information may include another type of information that describes the issue and/or the resolution. As shown by reference number 110, the cognitive insight platform may receive and/or determine domain hierarchy information associated with the issue resolution information (e.g., domain hierarchy information for domain hierarchy 1 through domain hierarchy X). For example, the issue resolution information may include information associated with a domain hierarchy for issues identified in the issue resolution information, and the cognitive insight platform may determine the domain hierarchy information based on receiving the issue resolution information. Additionally, or alternatively, the cognitive insight platform may receive the domain hierarchy information from another device (e.g., another server device, a user device, or the like).

The domain hierarchy information may include information that identifies one or more hierarchies associated with one or more domains to which the issue resolution information may be related. A domain may include a category and/or field of knowledge to which an issue corresponds. In some implementations, an item of issue resolution information may be assigned to a particular domain hierarchy, and questions and answers, associated with the issue, may be generated (on a per domain hierarchy basis), as described below.

In some implementations, the cognitive insight platform may receive another type of information associated with interpreting and/or preparing the issue resolution information, such as acronym information associated with one or more acronyms that may be included in the issue resolution information, synonym information associated with one or more words included in the issue resolution information, or the like.

Figure 1B:
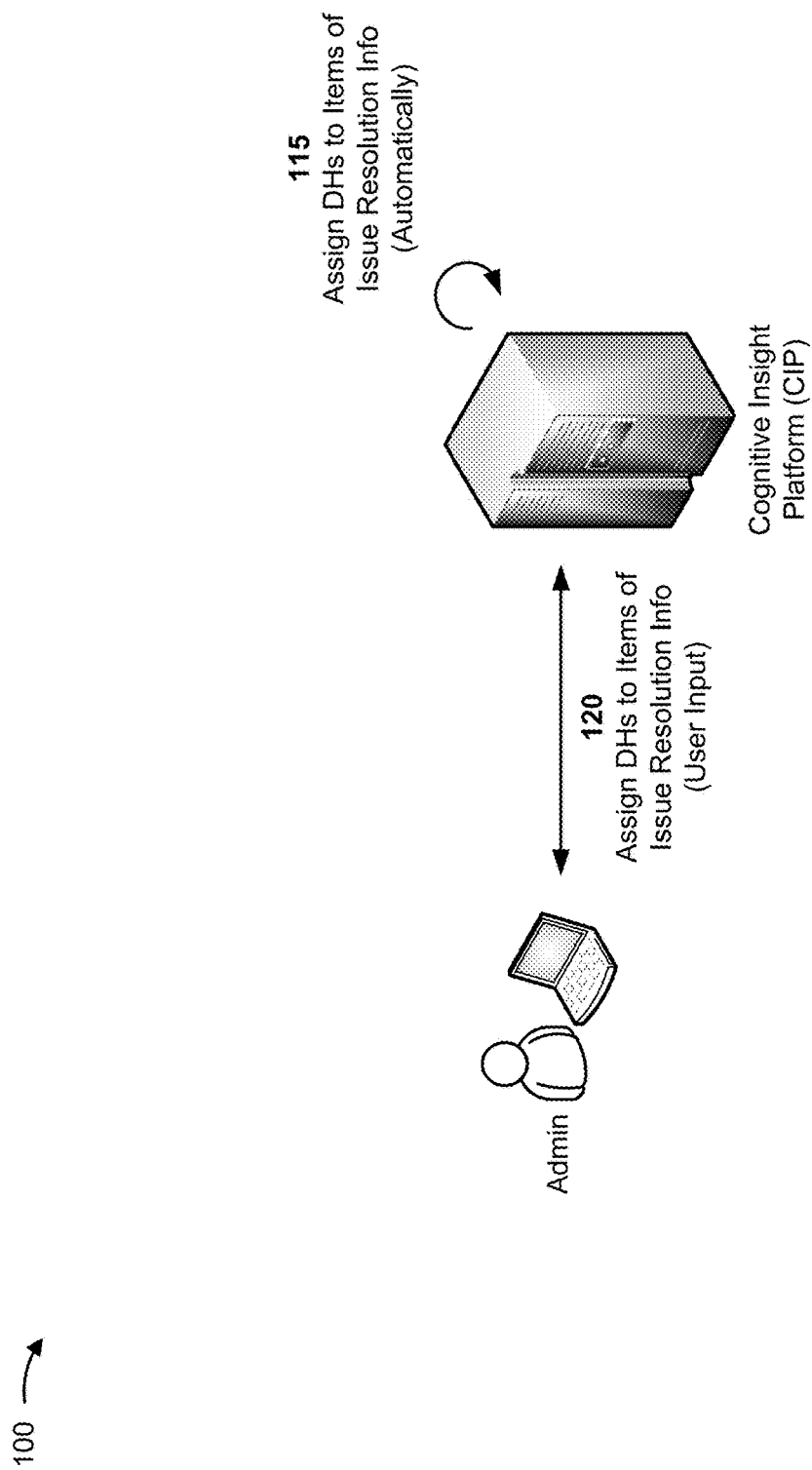

As shown in FIG. 1B, the cognitive insight platform may assign domain hierarchies to items of issue resolution information. For example, as shown by reference number 115, the cognitive insight platform may automatically assign (e.g., without user intervention, based on analyzing the issue resolution information) a domain hierarchy to items of issue resolution information. In some implementations, a user assigned to a first role (e.g., an administrator as shown in FIG. 1B) may review and/or modify a domain hierarchy assigned to an item of issue resolution. In some implementations, the cognitive insight platform may prevent one or more users assigned to other roles (e.g., at lower-levels than the administrator) from providing issue resolution to the cognitive insight platform, and reviewing and/or modifying the domain hierarchy assigned to the items of issue resolution information. In this way, the cognitive insight platform may prevent incorrect and/or inaccurate domain hierarchy assignment editing and/or modification by unauthorized users, thereby increasing accuracy of domain hierarchy assignments and, thus, improving training of the cognitive model.

As another example, as shown by reference number 120, the cognitive insight platform may assign a domain hierarchy to an item of issue resolution information based on user input (e.g., based on administrator input). In some implementations, the cognitive insight platform may prevent (i.e., not allow) one or more users assigned to other roles to assign the domain hierarchy to the item of issue resolution information (i.e., the administrator may control manual assignment of domain hierarchies to items of issue resolution information), thereby increasing accuracy of domain hierarchy assignments and, thus, improving training of the cognitive model.

In some implementations, assignment of an item of issue resolution information to a particular domain hierarchy provides for improved training of the cognitive model since issues, and the associated resolutions, identified in the issue resolution information, may be classified, grouped, and/or categorized in a consistent manner based on the domain hierarchy, which allows questions and answers to be generated by a user with expertise associated with the particular domain hierarchy, as described below.

Figure 1C:
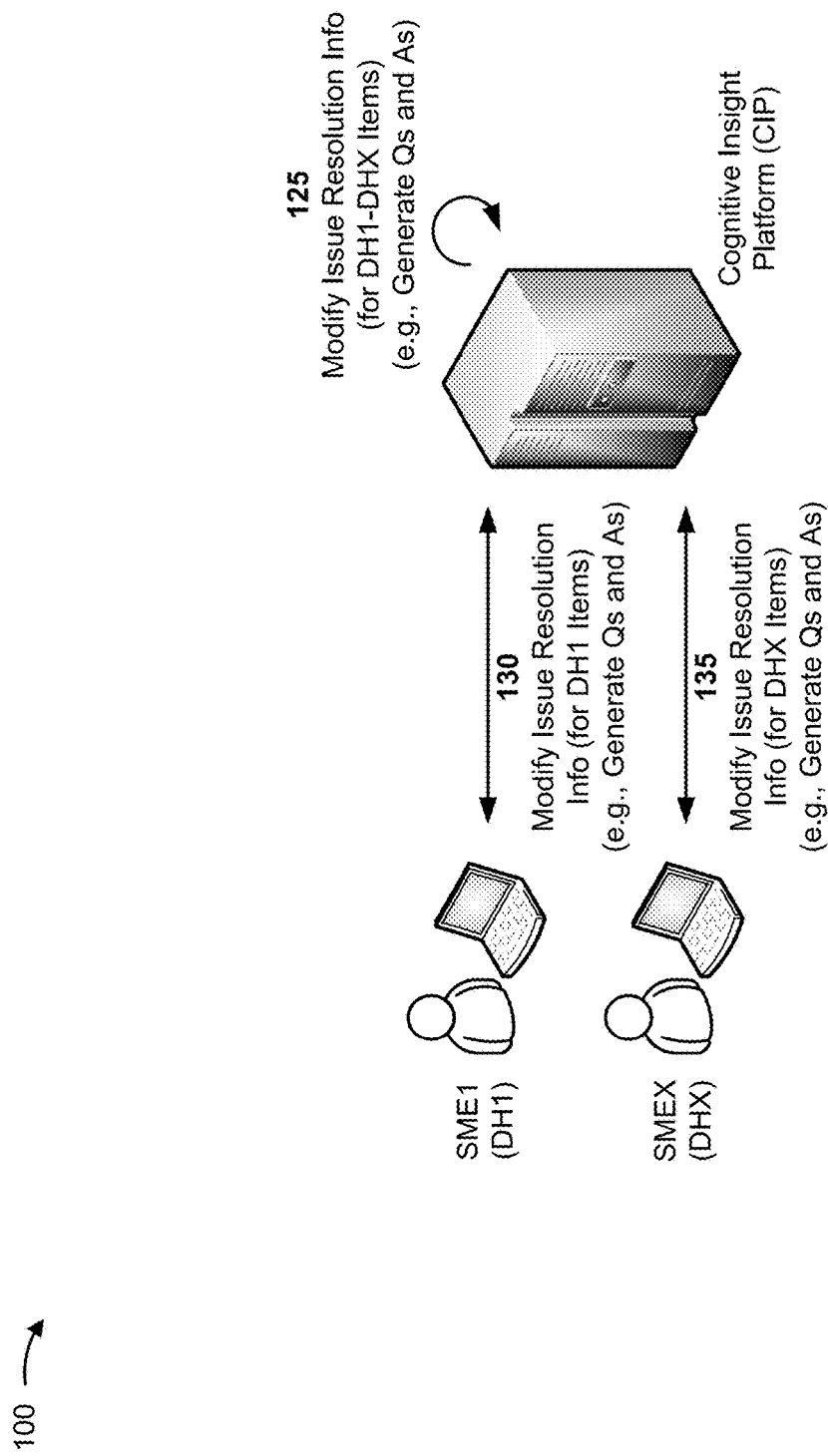

As shown in FIG. 1C, the cognitive insight platform may further prepare the issue resolution information by modifying (e.g., adding information to) the issue resolution information. For example, as shown by reference number 125, the cognitive insight platform may modify the issue resolution information by generating and adding one or more questions (e.g., a question, associated with the issue, that may be expected as input from a user when using the cognitive model) and a corresponding answer (e.g., an answer to the one or more questions and associated with the resolution information) to the item of issue resolution information.

In some implementations, the cognitive insight platform may generate the one or more questions and/or the answer automatically. For example, the cognitive insight platform may store or have access to a paraphrasing component configured to analyze the issue description and/or the resolution information (e.g., using a NLP model), and generate the one or more questions and/or the answer based on analyzing the issue description and/or the resolution information. In some implementations, the cognitive insight platform may automatically generate questions and/or answers for issue resolution information associated with multiple domain hierarchies (e.g., for issues across domain hierarchy 1 through domain hierarchy X). In some implementations, the cognitive insight platform may allow a user assigned to a second role (e.g., a subject matter expert (SME) associated with the domain hierarchy to which the item of issue resolution was assign) to modify and/or remove the automatically generated one or more questions and/or answers.

As another example, and as shown by reference numbers 130 and 135, the cognitive insight platform may prepare the issue resolution information by modifying the issue resolution information to include one or more questions and/or an answer received based on user input. For example, for a particular domain hierarchy (e.g., domain hierarchy 1, domain hierarchy X), a user assigned to the second role (e.g., SME1, SMEX, respectively) may provide, as input via a user device, one or more questions and/or an answer associated with an item of issue resolution information to which the particular domain hierarchy was assigned. In this way, questions and/or answers may be efficiently generated on a per domain hierarchy basis.

Figure 1D:
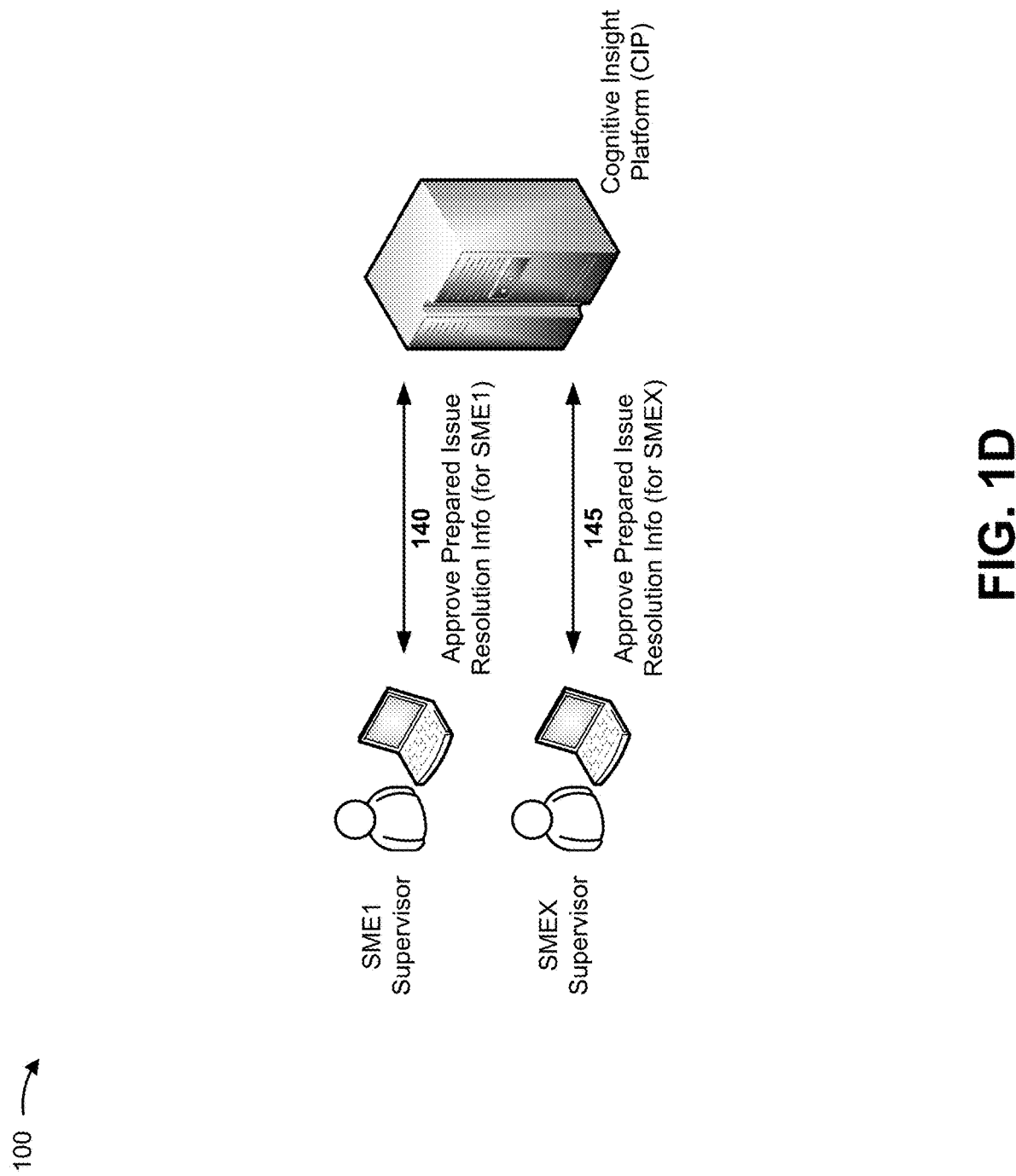

As shown in FIG. 1D, and by reference numbers 140 and 145, the cognitive insight platform may approve the prepared (i.e., modified) items of issue resolution information. For example, the cognitive insight platform may provide prepared items of issue resolution information, associated with a domain hierarchy, for display to a user assigned to a third role for the domain hierarchy.

As a particular example, as shown by reference number 140, the cognitive insight platform may provide prepared items of issue resolution information, associated with domain hierarchy 1 (e.g., provided by SME1, modified by SME1, and/or generated by the cognitive insight platform), to a supervisor of SME1. Here, the supervisor of SME1 may approve, further modify, or reject the prepared issue resolution information, associated with domain hierarchy 1, accordingly. As another example, as shown by reference number 145, the cognitive insight platform may provide prepared items of issue resolution information, associated with domain hierarchy X (e.g., provided by SMEX, modified by SMEX, and/or generated by the cognitive insight platform), to a supervisor of SMEX. Here, the supervisor of SMEX may approve, further modify, or reject the prepared issue resolution information, associated with domain hierarchy X, accordingly.

In this way, the cognitive insight platform may receive and prepare vast quantities issue resolution information (e.g., thousands of items of information, millions of items of information, billions of items of information), associated with multiple issues, using a role-based workflow. In some implementations, preparation of the issue resolution information in this manner improves training of the cognitive model by decreasing a likelihood that incorrect and/or inaccurate questions and/or answers are included in a data corpus that is used to train the cognitive model, as described below.

Figure 1E:
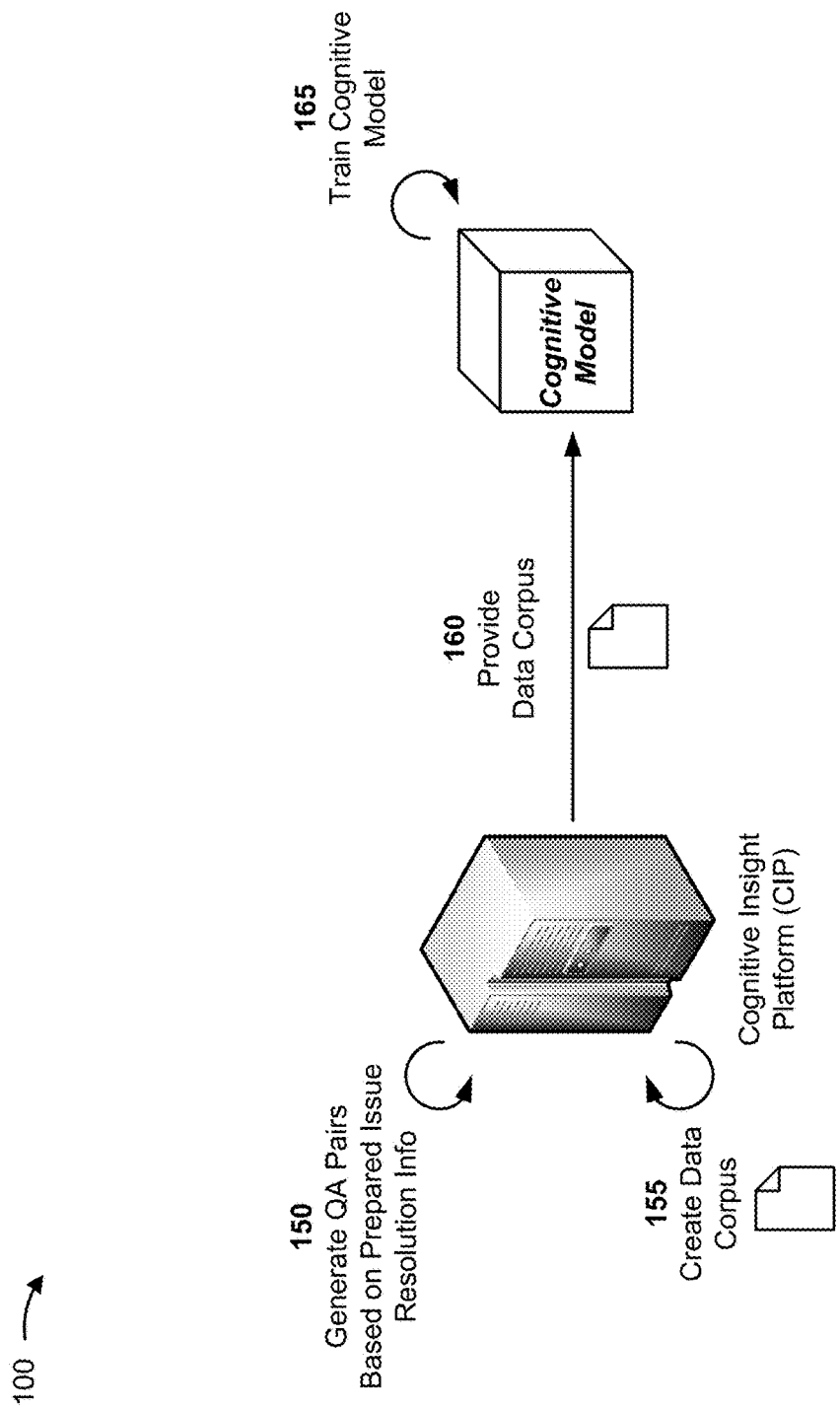

As shown in FIG. 1E, and by reference number 150, the cognitive insight platform may generate question/answer (QA) pairs based on the prepared issue resolution information. For example, as described above, an item of prepared issue resolution information may include a set of questions, associated with an issue, and an answer to the set of questions. Here, the cognitive insight platform may generate a set of QA pairs corresponding to each question included in the prepared item of issue resolution information. In this example, each QA pair, of the set of QA pairs, may include a same answer and a different question (e.g., since each question, included in the prepared item of issue resolution information, should result in the same answer).

In some implementations, the cognitive insight platform may associate another type of information with the QA pair, such as an approval status corresponding to the prepared item of issue resolution information, the domain hierarchy associated with the prepared item of issue resolution information, or the like. In some implementations, the cognitive insight platform may create the data corpus such that the data corpus includes QA pairs, information that identifies the QA pairs, information that identifies the answers, and/or one or more other types of information associated with the items of prepared issue resolution information.

As shown by reference number 155, the cognitive insight platform may create a data corpus including the QA pairs (and the associated information). In some implementations, the cognitive insight platform may generate one or more files that include the data corpus (e.g., files in a format that may be used by the cognitive model), such as one or more hypertext markup language (HTML) files, extensible markup language (XML) files, comma separated value (CSV) files, or the like. In some implementations, the cognitive insight platform may provide (e.g., upload) one or more portions of the data corpus for use in training the cognitive model, as described below.

As shown by reference number 160, the cognitive insight platform may provide the data corpus in order to allow the cognitive model to be trained using the data corpus (e.g., based on the QA pairs included in the data corpus). As shown by reference number 165, the cognitive model may be trained using the data corpus.

Figure 1F:
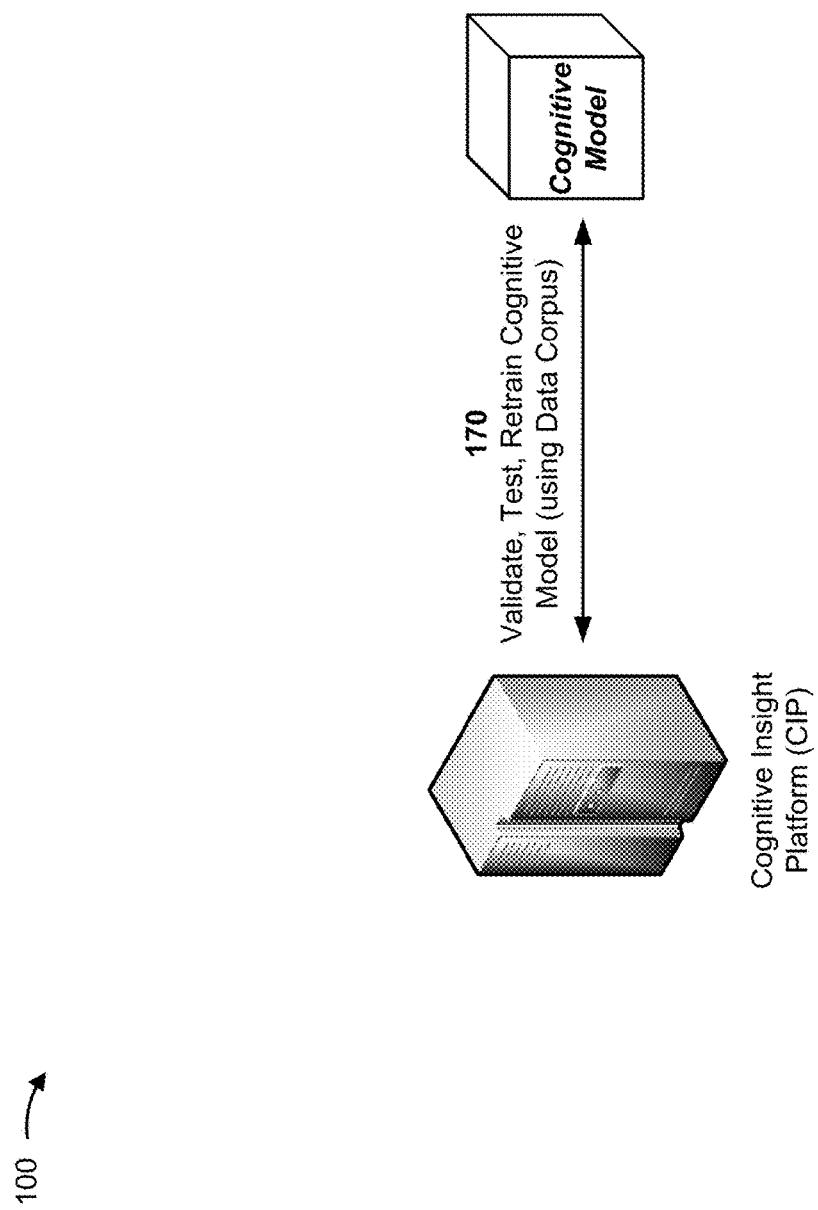

As shown in FIG. 1F, and by reference number 170, after training of the cognitive model (e.g., using a portion of the data included in the data corpus), the cognitive insight platform may validate the training of the cognitive model (e.g., based on the portion of the data corpus used to train the cognitive model) and/or test the training of the cognitive model (e.g., based on a portion of the data corpus that was not used to train the cognitive model). In some implementations, the cognitive insight platform may determine one or more validation metrics and/or performance metrics based on validating and/or testing the training of the cognitive model. In some implementations, if the cognitive insight platform determines that the cognitive model is not sufficiently trained (e.g., when one or more validation metrics and/or performance metrics do not satisfy a corresponding threshold), then the cognitive insight platform may cause the cognitive model to be retrained (e.g., based on the portion of the data corpus that was used to train the cognitive model and/or based on a portion of the data corpus that was not used to train the cognitive model).

In this way, a cognitive insight platform may be capable of implementing a role-based work flow that efficiently and effectively processes issue resolution information to be used for training a cognitive model associated with the cognitive insight platform. In some implementations, implementation of the role-based workflow by the cognitive insight platform may improve training of the cognitive model by, for example, reducing an amount of computing resources consumed during training of the cognitive model (e.g., since the data corpus is prepared for optimized training of the cognitive model). Moreover, implementation of the role-based workflow may reduce a likelihood of error and/or inaccurate data being used to train the cognitive model, which results in improved model performance.

As indicated above, FIGS. 1A-1F are provided merely as examples. Other examples are possible and may differ from what was described with regard to FIGS. 1A-1F.

Figure 2:
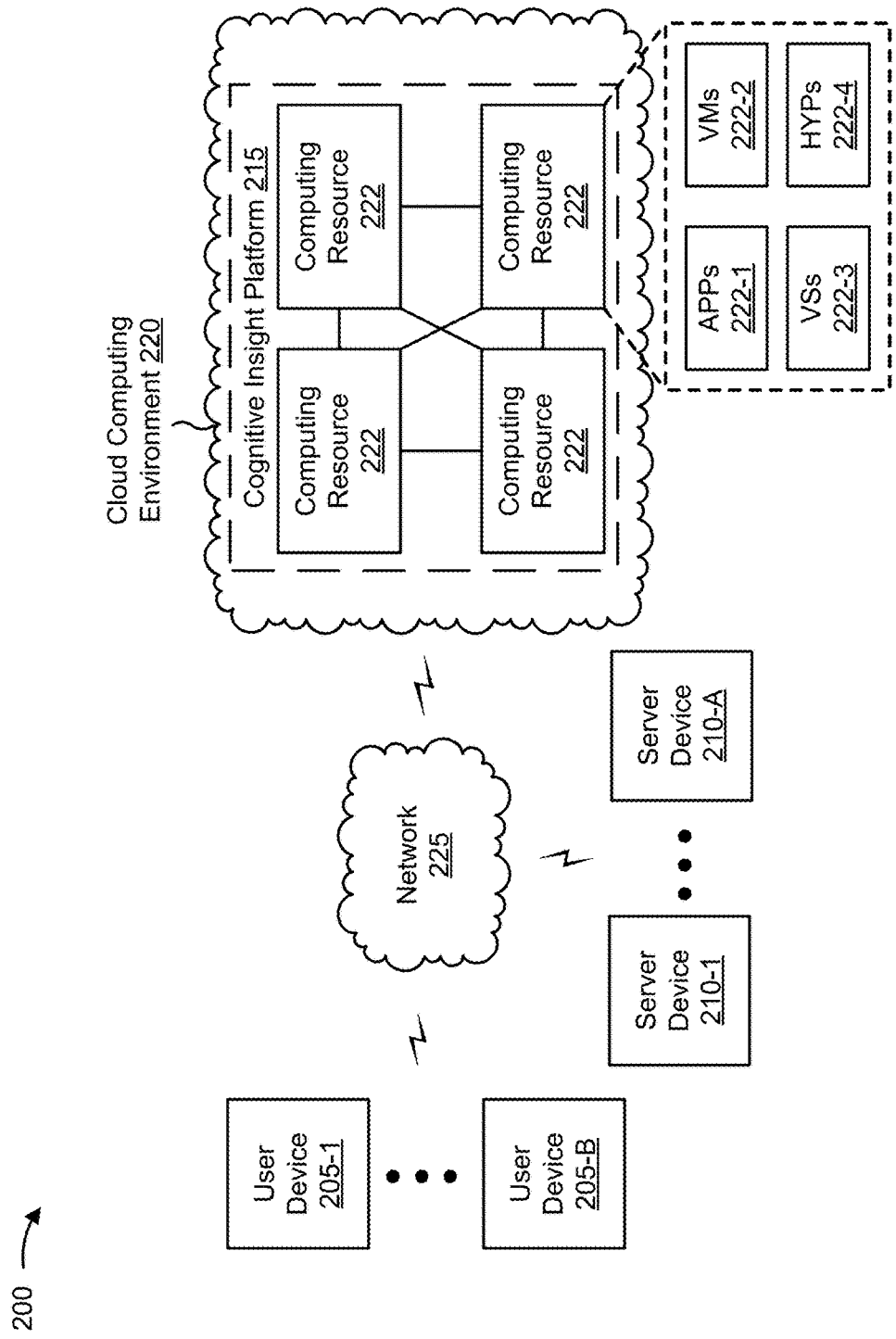
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 205, one or more server devices 210, a cognitive insight platform 215 hosted within a cloud computing environment 220, and a network 225. Devices of environment 200 may interconnect via wired connections, wireless connections, or a combination of wired and wireless connections.

User device 205 includes one or more devices capable of receiving, generating, storing, processing, and/or providing information associated with cognitive insight platform 215, such as information associated with processing issue resolution information. For example, user device 205 may include a communication and computing device, such as a mobile phone (e.g., a smart phone, a radiotelephone, etc.), a laptop computer, a desktop computer, a tablet computer, a handheld computer, a wearable communication device (e.g., a smart wristwatch, a pair of smart eyeglasses, etc.), or a similar type of device.

Server device 210 includes one or more devices capable of receiving, collecting, obtaining, gathering, storing, processing, and/or providing issue resolution information for use in training cognitive insight platform 215. For example, server device 210 may include a server or a group of servers. In some implementations, server device 210 may include a device that stores or has access to issue resolution information that is to be used by cognitive insight platform 215. In some implementations, server device 210 may be capable of providing information to cognitive insight platform 215.

Cognitive insight platform 215 includes one or more devices capable of processing issue resolution information, training a cognitive model, and/or providing an answer to a question using the trained cognitive model. For example, cognitive insight platform 215 may include a server or a group of servers. In some implementations, as shown, cognitive insight platform 215 may be hosted in cloud computing environment 220. Notably, while implementations described herein describe cognitive insight platform 215 as being hosted in cloud computing environment 220, in some implementations, cognitive insight platform 215 may not be cloud-based (i.e., may be implemented outside of a cloud computing environment) or may be partially cloud-based.

Cloud computing environment 220 includes an environment that hosts cognitive insight platform 215. Cloud computing environment 220 may provide computation, software, data access, storage, etc. services that do not require end-user (e.g., user device 205) knowledge of a physical location and configuration of system(s) and/or device(s) that hosts cognitive insight platform 215. As shown, cloud computing environment 220 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host cognitive insight platform 215. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 may include a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 may include one or more software applications that may be provided to or accessed by user device 205 and/or server device 210. Application 222-1 may eliminate a need to install and execute the software applications on these devices. For example, application 222-1 may include software associated with cognitive insight platform 215 and/or any other software capable of being provided via cloud computing environment 220. In some implementations, one application 222-1 may send/receive information to/from one or more other applications 222-1, via virtual machine 222-2.

Virtual machine 222-2 may include a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of another device (e.g., user device 205 and/or server device 210), and may manage infrastructure of cloud computing environment 220, such as data management, synchronization, or long-duration data transfers.

Virtualized storage 222-3 may include one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 225 includes one or more wired and/or wireless networks. For example, network 225 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
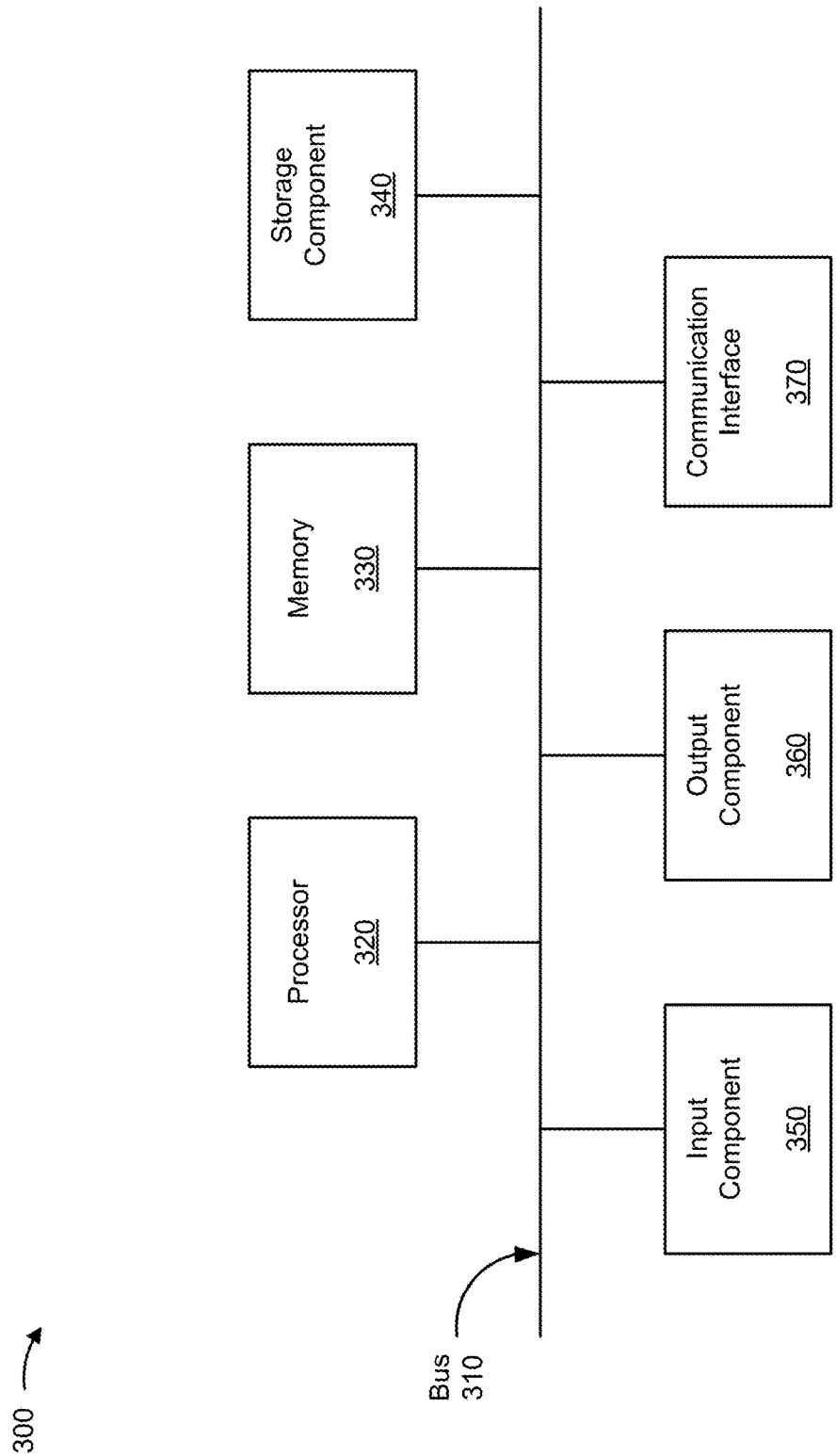
FIG. 3 is a diagram of example components of one or more devices of FIG. 2.

FIG. 3 is a diagram of example components of a device 300. Device 300 may correspond to user device 205, server device 210, and/or cognitive insight platform 215. In some implementations, user device 205, server device 210, and/or cognitive insight platform 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi® interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for processing data for use in training a cognitive model. In some implementations, one or more process blocks of FIG. 4 may be performed by cognitive insight platform 215. In some implementations, one or more process blocks of FIG. 4 may be performed by another device or a group of devices separate from or including cognitive insight platform 215, such as user device 205 and/or server device 210.

As shown in FIG. 4, process 400 may include receiving issue resolution information associated with a cognitive model (block 410). For example, cognitive insight platform 215 may receive issue resolution information associated with the cognitive model.

The issue resolution information may include descriptions of issues and/or resolution information associated with the issues (i.e., a manner in which the issue may be resolved) based on which the cognitive model is to be trained to provide an output. For example, the issue resolution information may include a word, a group of words, a sentence, or the like, that describes an issue. As another example, the issue resolution information may also include a word, a group of words, a sentence, or the like, that describes a manner in which the issue may be resolved. The issue resolution information may include another type of information that describes the issue and/or the resolution. In some implementations, the issue resolution information includes information associated with multiple issues. In some implementations, each issue may be associated with one or more items of resolution information (e.g., when the issue may be resolved in multiple ways).

In some implementations, cognitive insight platform 215 may receive the issue resolution information from one or more data sources. For example, cognitive insight platform 215 may send, to one or more server devices 210 that store or have access to the issue resolution information, a request for the issue resolution information, and may receive, from the one or more server devices 210, a response that includes the issue resolution information. Additionally, or alternatively, the one or more server devices 210 may automatically (e.g., periodically, based on an update, based on a trigger, etc.) provide the issue resolution information to cognitive insight platform 215. Automatic provisioning of the issue resolution information to cognitive insight platform 215 may allow cognitive insight platform 215 to update and/or maintain up-to-date issue resolution information without user intervention.

Additionally, or alternatively, cognitive insight platform 215 may receive the issue resolution information from one or more user devices 205 (e.g., when a user provides issue resolution information as user input via user device 205).

In some implementations, cognitive insight platform 215 may receive the issue resolution information from different sources (e.g., different server devices 210 and/or user devices 205) and the issue resolution information can be in different formats. In such a case, cognitive insight platform 215 may normalize the issue resolution information (e.g., to a common format) for further processing.

In some implementations, cognitive insight platform 215 may receive domain hierarchy information associated with the issue resolution information. For example, in some implementations, the issue resolution information may include information associated with a domain hierarchy for issues identified in the issue resolution information. The domain hierarchy information may include information that identifies one or more hierarchies associated with one or more domains to which the issue resolution information may be related. A domain may include a category and/or field of knowledge to which an issue corresponds. In some implementations, a domain may include one or more sub-domains. Additionally, or alternatively, a sub-domain may include one or more sub-domains. Here, the domain hierarchy information may describe a hierarchy associated with one or more levels of domains and sub-domains. In some implementations, an item of issue resolution information may be assigned to a particular domain hierarchy during processing the issue resolution information, as described below. In some implementations, assignment of an item of issue resolution information to a particular domain hierarchy provides for improved training of the cognitive model since issues, and the associated resolutions, identified in the issue resolution information, may be classified, grouped, and/or categorized in a consistent manner based on the domain hierarchy.

Additionally, or alternatively, cognitive insight platform 215 may receive acronym information associated with the issue resolution information. For example, in some implementations, the issue resolution information may include acronym information associated with acronyms included in the issue resolution information. The acronym information may include information that defines one or more acronyms that may be included in the issue resolution information. In some implementations, the acronym information may be used to ensure that acronyms, included in the issue resolution information, are correctly interpreted by cognitive insight platform 215 and/or the cognitive model, thereby improving creation of the data corpus and/or training of the cognitive model.

Additionally, or alternatively, cognitive insight platform 215 may receive synonym information associated with the issue resolution information. The synonym information may include, for example, information that that describes one or more alternative words, phrases, or the like, ways of specifying a term included in the issue resolution information.

In some implementations, cognitive insight platform 215 may receive the issue resolution information based on input associated with a user assigned to a first role, such as an administrator associated with cognitive insight platform 215. Here, cognitive insight platform 215 may allow the user assigned to the first role to cause cognitive insight platform 215 to receive the issue resolution information, while cognitive insight platform 215 may not allow one or more users assigned to other roles (e.g., at lower-levels than the administrator) to cause cognitive insight platform 215 to receive issue resolution information (i.e., the administrator may control receipt of issue resolution information by cognitive insight platform 215). In this way, integrity of the issue resolution information may be ensured (e.g., by ensuring that only authorized users cause cognitive insight platform 215 to receive issue resolution information associated with the cognitive model).

As further shown in FIG. 4, process 400 may include preparing the issue resolution information based on receiving the issue resolution information (block 420). For example, cognitive insight platform 215 may prepare the issue resolution information based on receiving the issue resolution information. In some implementations, preparing the issue resolution information may include assigning a domain hierarchy to items of issue resolution information, modifying the issue resolution information, and/or approving the issue resolution information, as described below.

In some implementations, cognitive insight platform 215 may assign a domain hierarchy to items of issue resolution information. For example, cognitive insight platform 215 may assign a domain hierarchy, included in the domain hierarchy information, to each item of issue resolution information included in the issue resolution information. In other words, cognitive insight platform 215 may effectively categorize each item of issue resolution to match the categorized issue of issue resolution to a category or topic associated with a domain hierarchy.

In some implementations, cognitive insight platform 215 may automatically (e.g., without user intervention) assign the domain hierarchy to an item of issue resolution information. For example, cognitive insight platform 215 may analyze the domain hierarchy information and the item of issue resolution information (e.g., the issue description, the resolution information associated with the issue, etc.) and may determine, based on the analysis, a suggested and/or recommended domain hierarchy, included in the domain hierarchy information, to be assigned to the item of issue resolution information. Here, the user assigned to the first role (e.g., the administrator associated with cognitive insight platform 215) may review and/or modify the assigned domain hierarchy. In some implementations, cognitive insight platform 215 may not allow one or more users assigned to other roles (e.g., at lower-levels than the administrator) to review and/or modify the domain hierarchy assigned to the item of issue resolution information. In this way, cognitive insight platform 215 may ensure integrity of assigned domain hierarchy assignments (e.g., by preventing incorrect and/or inaccurate domain hierarchy assignment editing and/or modification by unauthorized users), thereby increasing accuracy of domain hierarchy assignments and, thus, improving training of the cognitive model.

Additionally, or alternatively, cognitive insight platform 215 may assign the domain hierarchy based on user input. For example, cognitive insight platform 215 may provide, for display to the user assigned to the first role (e.g., the administrator), the item of issue resolution information, and the administrator may select (e.g., via a drop down menu, a text box, a radio button) the domain hierarchy to be assigned to the item of issue resolution information. In some implementations, cognitive insight platform 215 may prevent (i.e., not allow) one or more users assigned to other roles to assign the domain hierarchy to the item of issue resolution information (i.e., the administrator may control manual assignment of domain hierarchies to items of issue resolution information), thereby increasing accuracy of domain hierarchy assignments and, thus, improving training of the cognitive model.

In some implementations, cognitive insight platform 215 may store information indicating that the domain hierarchy is assigned to the item of issue resolution information. In some implementations, after the domain hierarchy is assigned to the item of issue resolution information, cognitive insight platform 215 may allow modification of the item of issue resolution information, as described below.

In some implementations, cognitive insight platform 215 may modify the item of issue resolution information based on assigning the domain hierarchy. For example, after assignment of the domain hierarchy, cognitive insight platform 215 may allow one or more users assigned to a second role (e.g., a subject matter expert (SME) associated with the domain hierarchy and/or one or more domains or subdomains included in the domain hierarchy) to modify the issue resolution information.

In some implementations, cognitive insight platform 215 may modify the issue resolution information based on user input. For example, cognitive insight platform 215 may provide the issue resolution information for display to the user assigned to the second role (e.g., the SME), associated with the domain hierarchy, and may receive information associated with modifying the item of issue resolution information based on input provided by the user assigned to the second role. As a particular example, based on input from the user assigned to the second role, cognitive insight platform 215 may modify the issue description and/or the resolution information associated with the issue. As another example, cognitive insight platform 215 may, based on input from the user assigned to the second role, add additional information to the item of issue resolution information, such as a subject associated with the issue, one or more questions related to the issue (e.g., questions, associated with the issue, that the SME may expect a user to provide to the cognitive model), an answer related to the issue (e.g., an answer to the one or more questions and associated with the resolution information), or the like.

In some implementations, cognitive insight platform 215 may automatically provide, to user device 205 associated with the user assigned to the second role, a notification associated with the issue resolution information to be reviewed and/or modified by the user assigned to the second role. For example, cognitive insight platform 215 may provide, to user device 205 associated with the SME, a notification that cognitive insight platform 215 has assigned one or more items of issue resolution information to a domain hierarchy associated with the SME. In this way, cognitive insight platform 215 may automatically prompt preparation of the issue resolution information, even when user input is needed, thereby improving a speed at which the cognitive model is trained and/or updated.

Additionally, or alternatively, cognitive insight platform 215 may automatically modify the item of issue resolution information. For example, cognitive insight platform 215 may store or have access to a paraphrasing component configured to analyze the issue description and/or the resolution information (e.g., using a NLP model). Here the paraphrasing component, based on analyzing the issue description and/or the resolution information, may generate one or more questions to be added to the item of issue resolution information. The paraphrasing component may generate the one or more questions, and cognitive insight platform 215 may allow the user assigned to the second role to modify and/or remove the automatically generated one or more questions. In some implementations, the paraphrasing component may generate one or more answers to the one or more questions in a similar manner.

In some implementations, cognitive insight platform 215 may allow the user assigned to the second role to reject the domain hierarchy assignment, the one or more questions, and/or the one or more answers associated with the item of issue resolution information. For example, the SME may determine that the domain hierarchy assigned to the item of issue resolution information is incorrect, that the item of issue resolution information includes only information (e.g., rather than an issue and a resolution). Here, cognitive insight platform 215 may allow the SME to reject the domain hierarchy assignment, accordingly. In some implementations, cognitive insight platform 215 may allow a user assigned to a third role (e.g., a supervisor of the SME) and/or the user assigned to the first role (e.g., the administrator) to review the rejection of the domain hierarchy and act accordingly (e.g., approve the rejection and assign a new domain hierarchy, deny the rejection, etc.). In this way, cognitive insight platform 215 may facilitate assignment of domain hierarchies across multiple users, while maintaining integrity of such assignments, thereby increasing accuracy of domain hierarchy assignments and, thus, improving training of the cognitive model.

In some implementations, cognitive insight platform 215 may determine and provide a confidence score that indicates a degree of confidence that cognitive insight platform 215 has with regard to an automatically performed task (e.g., an assigned domain hierarchy, a generated question and/or answer, or the like). For example, a low confidence score (e.g., a score that does not satisfy a threshold) may indicate that the user should consider rejecting and/or modifying an output of the automatically performed task, while a high confidence score (e.g., a score that satisfies the threshold) may indicate that the user should consider approving the output of the automatically performed task. For those with low confidence scores, cognitive insight platform 215 may provide alternative outputs (e.g., an alternate category, additional questions, and additional answer, or the like) and may include a confidence score associated with the alternative output.

In some implementations, cognitive insight platform 215 may store the prepared (i.e., modified) issue resolution information. In some implementations, after cognitive insight platform 215 stores the prepared issue resolution information, cognitive insight platform 215 may approve the prepared item of issue resolution information, as described below.

In some implementations, cognitive insight platform 215 may approve the prepared item of issue resolution information. For example, cognitive insight platform 215 may provide the prepared issue resolution information for display to the user assigned to the third role (e.g., the supervisor of the SME). Here, the user assigned to the third role may review the prepared item of issue resolution information, and may approve and/or further modify the prepared item of issue resolution information. In some implementations, the user assigned to the third role may supervise multiple users assigned to the second role associated with the domain hierarchy. In some implementations, after the prepared item of issue resolution information is approved by the user assigned to the third role, the prepared item of issue resolution information may be included in the data corpus, as described below.

In this way, large numbers of items of issue resolution information (e.g., thousands of items of information, millions of items of information, billions of items of information, trillions of items of information), included in the issue resolution information, may be prepared such that the items of issue resolution information include questions and answers that may be included in the data corpus. Here, cognitive insight platform 215 may facilitate receipt and preparation of the issue resolution information by implementing different roles (e.g., the administrator, the SME, and the supervisor of the SME). This may allow cognitive insight platform 215 to efficiently receive and accurately prepare the issue resolution information for use in the data corpus. Further, the role-based workflow may reduce consumption of processing resources and/or time associated with preparing the issue resolution information.

As further shown in FIG. 4, process 400 may include creating, based on preparing the issue resolution information, a data corpus for training the cognitive model (block 430). For example, cognitive insight platform 215 may create, based on preparing the issue resolution information, a data corpus for training the cognitive model.

The data corpus may, in some implementations, include a set of question/answer (QA) pairs generated based on the prepared issue resolution information. For example, in some implementations, cognitive insight platform 215 may create the data corpus by generating QA pairs associated with the items of prepared issue resolution information. For example, as described above, an item of prepared issue resolution information may include a set of questions, associated with an issue, and an answer to the set of questions. Here, cognitive insight platform 215 may generate a set of QA pairs corresponding to each question included in the prepared item of issue resolution information. In this example, each QA pair, of the set of QA pairs, may include a same answer and a different question (e.g., since each question, included in the prepared item of issue resolution information, should result in the same answer).

In some implementations, cognitive insight platform 215 may associate a pair identifier and an answer identifier with the QA pair. For example, cognitive insight platform 215 may assign a unique identifier (e.g., a number, a string of characters, etc.) to each QA pair (e.g., such that each QA pair is identified by a unique pair identifier). Continuing with this example, cognitive insight platform 215 may also assign an answer identifier (e.g., a number, a string of characters, etc.) to each QA pair. The answer identifier may include an identifier corresponding to the answer included in the QA pair. For example, cognitive insight platform 215 may assign a same answer identifier (e.g., a number, a string of characters, etc.) to each QA pair associated with a particular item of prepared issue resolution information (e.g., since each question is associated with the same answer). In other words, a same answer identifier may be assigned to multiple QA pairs. Additionally, or alternatively, cognitive insight platform 215 may associate another type of information with the QA pair, such as an approval status corresponding to the prepared item of issue resolution information, the domain hierarchy associated with the prepared item of issue resolution information, or the like. In some implementations, cognitive insight platform 215 may create the data corpus such that the data corpus includes QA pairs, pair identifiers, answer identifiers, and/or one or more other types of information associated with the items of prepared issue resolution information. In some implementations, the pair identifier may be used to facilitate simple identification of a QA pair and/or a corresponding answer in.

In some implementations, cognitive insight platform 215 may generate one or more files that include the data corpus (e.g., files in a format that may be used by the cognitive model). For example, cognitive insight platform 215 may generate a hypertext markup language (HTML) file, an extensible markup language (XML) file, a comma separated value (CSV) file, or the like, to include in the data corpus. In some implementations, cognitive insight platform 215 may provide (e.g., upload) one or more portions of the data corpus for use in training the cognitive model, as described below.

As further shown in FIG. 4, process 400 may include providing the data corpus for training of the cognitive model (block 440). For example, cognitive insight platform 215 may provide the data corpus for training of the cognitive model.

In some implementations, cognitive insight platform 215 may provide the data corpus in order to cause the cognitive model to be trained using the data corpus. For example, cognitive insight platform 215 may provide a portion of the data corpus to be used to train the cognitive model (herein referred to as training data), and the cognitive model may apply one or more machine learning techniques to analyze the training data and train and/or update the cognitive model based on the analysis. In some implementations, the cognitive model may be stored and/or maintained by one or more devices of cognitive insight platform 215 and/or one or more other devices included in (or external to) cloud computing environment 220.

In some implementations, cognitive insight platform 215 may verify the training of the cognitive model. For example, cognitive insight platform 215 may provide questions, included in the training data, as input to the cognitive model. Here, cognitive insight platform 215 may receive, as an output from the cognitive model, answers corresponding to the questions. In some implementations, cognitive insight platform 215 may determine and provide information associated with one or more validation metrics, such as accuracy (e.g., a number of correct answers output), precision (e.g., a number of relevant answers output by the cognitive model), recall (e.g., a number of answers output), or the like, based on the output of the cognitive model. In some implementations, such information may be provided for display to a user via user device 205. Similarly, the cognitive model may provide, to cognitive insight platform 215, information associated with a confidence level (e.g., a percentage from 0% to 100%, a value from 0.0 to 1.0, etc.), associated with each answer, at which the cognitive model expects that the answer is responsive to the question, correct, useful, or the like.

Here, cognitive insight platform 215 may verify the training of the cognitive model when the one or more validation metrics satisfy a validation threshold and/or when the confidence levels satisfy a confidence threshold (e.g., 99%, 0.95, etc.). In a case where the validation metrics do not satisfy the corresponding thresholds, cognitive insight platform 215 may retrain the cognitive model using the training data (e.g., in order to improve the validation metrics for the training data), additional training data, and/or user input. Similarly, in a case where the confidence level does not satisfy the training threshold, or when the cognitive model is over-confident (e.g., has high confidence in an incorrect answer) or under-confident (e.g., has low confidence in a correct answer), cognitive insight platform 215 may train the cognitive model using additional training data and/or user input (e.g., in order to improve the confidence level for the training data).

Additionally, or alternatively, cognitive insight platform 215 may test the training of the cognitive model. For example, cognitive insight platform 215 may upload a portion of the data corpus that was not used to train the cognitive model (herein referred to as testing data). Here, cognitive insight platform 215 may provide questions, included in the testing data, as input to the cognitive model, and may receive, as output, answers corresponding to the questions. The cognitive model may also determine and provide, to cognitive insight platform 215, information associated with a confidence level, associated with each answer, at which the cognitive model expects that the answer is responsive to the question, correct, useful, or the like. Here, cognitive insight platform 215 may compare the confidence level to a testing threshold (e.g., 70%, 0.8, etc.). In a case where the confidence level does not satisfy the testing threshold, or when the cognitive model is over-confident or under-confident, cognitive insight platform 215 may train the cognitive model using additional training data and/or user input (e.g., in order to improve the confidence level for the testing data).

Additionally, or alternatively, cognitive insight platform 215 may compare the answers received during testing to one or more known answers (e.g., included in the testing data), and may determine one or more performance metrics, such as accuracy, precision, or the like, based on the output of the cognitive model. In some implementations, such information may be provided for display to a user via user device 205. In a case where one or more of the performance metrics does not satisfy a performance threshold (e.g., an accuracy threshold, a precision threshold, or the like), cognitive insight platform 215 may train the cognitive model using additional training data and/or user input (e.g., in order to improve the performance of the cognitive model).

In some implementations, after training, verifying, and/or testing the cognitive model, cognitive insight platform 215 may be capable of receiving (e.g., based on user input) a question, providing the question as an input to the cognitive model, determining one or more answers to the question (e.g., including one or more corresponding confidence levels), and providing the one or more answers to the question for display to the user.

In some implementations, cognitive insight platform 215 may receive feedback associated with an answer provided by cognitive insight platform 215. For example, the user may indicate (e.g., by selecting a "Yes" button or a "No" button on a user interface associated with the cognitive model), whether the answer provided is responsive and/or useful in response to the question. Here, cognitive insight platform 215 may receive the feedback, store the feedback, and update the cognitive model (e.g., using a machine learning technique). In this way, cognitive insight platform 215 may improve responsiveness and/or usefulness of answers provided by cognitive insight platform 215 over time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may provide a cognitive insight platform that implements a role-based workflow for processing issue resolution information that is to be used for training a cognitive model associated with cognitive insight platform 215. The role-based workflow may facilitate efficient receipt of issue resolution information, accurate preparation of the issue resolution information for use in a data corpus, and preparation of the data corpus for use in training the cognitive model. Processing of issue resolution information in this manner may lead to reduced consumption of processing resources, memory resources, and/or temporal resources (e.g., man hours) and efficient and/or effective training of the cognitive model.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more processor, and one or more memories, communicatively coupled to the one or more processors and having processor-executable instructions stored therein, which when executed by the one or more processors, cause the one or more processors, to:
        receive issue resolution information associated with a cognitive model, the issue resolution information including an item of issue resolution information that describes an issue and a resolution corresponding to the issue;
        identify a plurality of domain hierarchies associated with one or more domains that may be related to the issue resolution information, wherein the one or more domains include a category or field of knowledge to which the issue corresponds, and
        wherein the plurality of domain hierarchies are associated with different issue resolution information;
        automatically assign, without user intervention, the item of issue resolution information to a particular domain hierarchy of the plurality of domain hierarchies;
        determine a confidence score indicating a degree of confidence associated with assigning the item of issue resolution information to the particular domain hierarchy;
        provide, to a first user, an interface to review or modify the particular domain hierarchy, the first user being an administrator associated with the device, the first user to review or modify the particular domain hierarchy automatically selected from the plurality of domain hierarchies, another domain hierarchy, of the plurality of domain hierarchies, being provided based on the confidence score not satisfying a threshold, and the first user to manually select the particular domain hierarchy;
        receive user input associated with assigning the item of issue resolution information to the particular domain hierarchy or the other domain hierarchy, the user input associated with assigning the item of issue resolution information to the particular domain hierarchy or the other domain hierarchy being received from the first user;
        generate a set of questions and an answer corresponding to the item of issue resolution information, the generating of the set of questions and the answer being based on user input by a second user that is different from the first user, and the second user being prevented from editing or modifying the assigning of the item of issue resolution information to the particular domain hierarchy or the other domain hierarchy;
        approve the set of questions and the answer corresponding to the item of issue resolution information, the approving of the set of questions and the answer being associated with a third user that is different from the first user and the second user;
        generate, based on approving the set of questions and the answer, a set of question/answer (QA) pairs for the set of questions and the answer, each QA pair, of the set of QA pairs, being associated with a question, of the set of questions, and the answer;
        create a data corpus including the set of QA pairs;
        provide the data corpus to cause the cognitive model to be trained based on a portion of the data corpus;
        determine a performance metric based on an output of the cognitive model;
        determine whether the performance metric satisfies a threshold corresponding to the performance metric; and
        selectively: validate the training of the cognitive model when the performance metric satisfies the threshold corresponding to the performance metric, or
        cause the cognitive model to be retrained when the performance metric does not satisfy the threshold corresponding to the performance metric.

2. The device of claim 1, where the one or more processors are further to:
    analyze domain hierarchy information, associated with the plurality of domain hierarchies, and the item of issue resolution information;
    automatically determine, based on analyzing the domain hierarchy information and the item of issue resolution information, that the item of issue resolution information is to be assigned to the particular domain hierarchy; and
    where the one or more processors, to assign the item of issue resolution information to the particular domain hierarchy, are configured to:
        automatically assign the item of issue resolution information to the particular domain hierarchy based on automatically determining that the item of issue resolution information is to be automatically assigned to the particular domain hierarchy.

3. The device of claim 1, where the one or more processors are further to:
analyze, using a paraphrasing technique, the item of issue resolution information; and
where the one or more processors, to generate the set of questions and the answer corresponding to the item of issue resolution information, are configured to:
automatically generate the set of questions and the answer based on analyzing the item of issue resolution information using the paraphrasing technique.

4. The device of claim 1, where the one or more processors are further to:
provide, based on assigning the item of issue resolution information to the particular domain hierarchy, a notification to a user device associated with the second user,
the notification being associated with notifying the second user that the item of issue resolution information has been assigned to the particular domain hierarchy.

5. The device of claim 1, where the one or more processors are further to:
receive user input associated with approving the set of questions and the answer,
the user input associated with approving the set of questions and the answer being provided by the third user; and
where the one or more processors, to approve the set of questions and the answer corresponding to the item of issue resolution information, are configured to:
approve the set of questions and the answer based on the user input associated with approving the set of questions and the answer.

6. The device of claim 1, where the one or more processors are further to:
receive domain hierarchy information that includes information associated with the plurality of domain hierarchies; and
where the one or more processors, to assign the item of issue resolution information to the particular domain hierarchy, are configured to:
assign the item of issue resolution information to the particular domain hierarchy based on the domain hierarchy information.

7. A method, comprising:
receiving, by a device, issue resolution information associated with a cognitive model, the issue resolution information including an item of issue resolution information that describes an issue and a resolution to the issue;
identifying, by the device, a plurality of domain hierarchies associated with one or more domains that may be related to the issue resolution information, wherein the one or more domains include a category or field of knowledge to which the issue corresponds, and wherein the plurality of domain hierarchies are associated with different issue resolution information;
automatically assigning, by the device and without user intervention, the item of issue resolution information to a particular domain hierarchy of the plurality of domain hierarchies;
determining, by the device, a confidence score indicating a degree of confidence associated with assigning the item of issue resolution information to the particular domain hierarchy;
providing, by the device and to a first user, an interface to review or modify the particular domain hierarchy, the first user being an administrator associated with the device, the first user to manually review or modify the particular domain hierarchy automatically selected from the plurality of domain hierarchies, another domain hierarchy, of the plurality of domain hierarchies, being provided based on the confidence score not satisfying a threshold, and the first user to select the particular domain hierarchy via at least one of:
a drop down menu, or
a radio button;
receiving, by the device, user input associated with assigning the item of issue resolution information to the particular domain hierarchy or other domain hierarchy, the user input associated with assigning the item of issue resolution information to the particular domain hierarchy or other domain hierarchy being received from the first user;
determining, by the device, one or more questions corresponding to the item of issue resolution information and an answer associated with the one or more questions, the determining of the one or more questions and the answer being based on user input by a second user that is different from the first user, the second user being prevented from editing or modifying the assigning of the item of issue resolution information to the particular domain hierarchy or other domain hierarchy;
approving, by the device, the one or more questions and the answer, the approving of the one or more questions and the answer being associated with a third user that is different from the first user and the second user;
generating, by the device and based on approving the one or more questions and the answer, one or more question/answer (QA) pairs, each QA pair, of the one or more QA pairs, being associated with a question, of the one or more questions, and the answer;
creating, by the device, a data corpus including the one or more QA pairs;
causing, by the device, the cognitive model to be trained based on a portion of the data corpus;
determining, by the device, a performance metric based on an output of the cognitive model;
determining, by the device, whether the performance metric satisfies a threshold corresponding to the performance metric; and
selectively: validating, by the device, the training of the cognitive model when the performance metric satisfies the threshold corresponding to the performance metric, or
causing, by the device, the cognitive model to be retrained when the performance metric does not satisfy the threshold corresponding to the performance metric.

8. The method of claim 7,
where automatically assigning the item of issue resolution information to the particular domain hierarchy comprises:
automatically assigning the item of issue resolution information to the particular domain hierarchy based on the user input associated with assigning the item of issue resolution information to the particular domain hierarchy received from the first user.

9. The method of claim 7, further comprising:
providing, based on automatically assigning the item of issue resolution information to the particular domain hierarchy, a notification to a user device associated with the second user,
   the notification being associated with notifying the second user that the item of issue resolution information has been assigned to the particular domain hierarchy.

10. The method of claim 7, further comprising:
receiving user input associated with approving the one or more questions and the answer,
   the user input associated with approving the one or more questions and the answer being provided by the third user; and
to approve the one or more questions and the answer, the method comprises:
   approving the one or more questions and the answer based on the user input associated with approving the one or more questions and the answer provided by the third user.

11. The method of claim 7, where, after causing the cognitive model to be trained based on the portion of the data corpus, the method further comprises:
determining another performance metric based on another output of the cognitive model associated with another portion of the data corpus;
determining that the other performance metric does not satisfy a threshold corresponding to the other performance metric; and
causing the cognitive model to be retrained based on determining that the other performance metric does not satisfy the threshold corresponding to the other performance metric.

12. The method of claim 11, where causing the cognitive model to be retrained comprises:
causing the cognitive model to be retrained based on at least the other portion of the data corpus.

13. A non-transitory computer-readable medium storing instructions, the instructions comprising:
one or more instructions that, when executed by one or more processors of a device, cause the one or more processors to:
receive issue resolution information associated with a cognitive model, the issue resolution information including an item of issue resolution information that describes an issue and a resolution corresponding to the issue;
identify a plurality of domain hierarchies associated with one or more domains that may be related to the issue resolution information, wherein the one or more domains include a category or field of knowledge to which the issue corresponds, and wherein the plurality of domain hierarchies is associated with different issue resolution information;
automatically assign, without user intervention, the item of issue resolution information to a particular domain hierarchy, of the plurality of domain hierarchies;
determine a confidence score indicating a degree of confidence associated with assigning the item of issue resolution information to the particular domain hierarchy;
provide, to a first user, an interface to review or modify the particular domain hierarchy, the first user being an administrator associated with the device, the first user to review or modify the particular domain hierarchy automatically selected from the plurality of domain hierarchies, and another domain hierarchy, of the plurality of domain hierarchies, being provided based on the confidence score not satisfying a threshold;
receive user input associated with assigning the item of issue resolution information to the particular domain hierarchy or the other domain hierarchy, the user input associated with assigning the item of issue resolution information to the particular domain hierarchy or the other domain hierarchy being received from the first user;
generate, based on assigning the item of issue resolution information to the particular domain hierarchy or the other domain hierarchy, a question and an answer corresponding to the item of issue resolution information, the generating of the question and the answer being based on user input by a second user that is different from the first user, and the second user being prevented from editing or modifying the assigning of the item of issue resolution information to the particular domain hierarchy or the other domain hierarchy;
approve, based on generating the question and the answer, the question and the answer corresponding to the item of issue resolution information;
generate, based on approving the question and the answer, a question/answer (QA) pair corresponding to the question and the answer;
create a data corpus including the QA pair;
provide the data corpus, after creating the data corpus, to cause the cognitive model to be trained based on a portion of the data corpus;
determine a performance metric based on an output of the cognitive model;
determine whether the performance metric satisfies a threshold corresponding to the performance metric; and
selectively: validate the training of the cognitive model when the performance metric satisfies the threshold corresponding to the performance metric, or
cause the cognitive model to be retrained when the performance metric does not satisfy the threshold corresponding to the performance metric.

14. The non-transitory computer-readable medium of claim 13, where:
the approving of the question and the answer is associated with a third user that is different from the first user and the second user.

15. The non-transitory computer-readable medium of claim 13, where the one or more instructions, when executed by the one or more processors, further cause the one or more processors to:
analyze domain hierarchy information, associated with the plurality of domain hierarchies, and the item of issue resolution information;
automatically determine, based on analyzing the domain hierarchy information and the item of issue resolution information that the item of issue resolution information is to be assigned to the particular domain hierarchy; and
where the one or more instructions, that cause the one or more processors to automatically assign the item of issue resolution information to the particular domain hierarchy, cause the one or more processors to:

assign the item of issue resolution information to the particular domain hierarchy based on automatically determining that the item of issue resolution information is to be assigned to the particular domain hierarchy.

16. The non-transitory computer-readable medium of claim 13, where the one or more instructions, when executed by the one or more processors, further cause the one or more processors to:

analyze, using a paraphrasing technique, the item of issue resolution information; and where the one or more instructions, that cause the one or more processors to generate the question and the answer corresponding to the item of issue resolution information, cause the one or more processors to:

automatically generate the question and the answer based on analyzing the item of issue resolution information using the paraphrasing technique.

17. The device of claim 1, where the one or more processors are further to:

associate, with the one or more QA pairs, an approval status corresponding to the item of issue resolution information; and where the one or more processors, creating the data corpus including the one or more QA pairs, are further to:

create the data corpus to include the one or more QA pairs and the approval status.

18. The method of claim 7, further comprising:

associating, with the one or more QA pairs, an approval status corresponding to the item of issue resolution information; and where creating the data corpus including the one or more QA pairs comprises:

creating the data corpus to include the one or more QA pairs and the approval status.

19. The non-transitory computer-readable medium of claim 13, where the one or more instructions, when executed by the one or more processors, further cause the one or more processors to:

associate, with the one or more QA pairs, an approval status corresponding to the item of issue resolution information; and where the one or more processors, when creating the data corpus including the one or more QA pairs, are further to:

create the data corpus to include the one or more QA pairs and the approval status.

20. The non-transitory computer-readable medium of claim 13, where the performance metric comprises one or more of:

an accuracy associated with the cognitive model,
a precision associated with the cognitive model, or
a recall associated with the cognitive model.

* * * * *